(12) United States Patent
Jeon

(10) Patent No.: US 12,380,668 B2
(45) Date of Patent: Aug. 5, 2025

(54) METHOD, COMPUTING DEVICE, AND COMPUTER-READABLE MEDIUM FOR PROVIDING GUIDE INFORMATION ON CONTOUR INFORMATION OF OBJECT INCLUDED IN IMAGE IN CROWDSOURCING

(71) Applicant: SELECT STAR, INC., Daejeon (KR)

(72) Inventor: Munhwi Jeon, Seoul (KR)

(*) Notice: Subject to any disclaimer, the term of this patent is extended or adjusted under 35 U.S.C. 154(b) by 56 days.

(21) Appl. No.: 17/910,806

(22) PCT Filed: Jan. 21, 2022

(86) PCT No.: PCT/KR2022/001085
§ 371 (c)(1),
(2) Date: Sep. 10, 2022

(87) PCT Pub. No.: WO2022/255584
PCT Pub. Date: Dec. 8, 2022

(65) Prior Publication Data
US 2024/0203087 A1  Jun. 20, 2024

(30) Foreign Application Priority Data
Jun. 4, 2021 (KR) .................. 10-2021-0072767

(51) Int. Cl.
*G06V 10/46* (2022.01)
*G06T 7/62* (2017.01)

(52) U.S. Cl.
CPC ............. *G06V 10/46* (2022.01); *G06T 7/62* (2017.01)

(58) Field of Classification Search
CPC ...... G06V 10/46; G06V 10/44; G06V 10/457; G06V 20/70; G06T 7/62
See application file for complete search history.

(56) References Cited

U.S. PATENT DOCUMENTS 10,317,203 B2 * 6/2019 Minakawa ....... G01N 21/95607
11,688,081 B2 * 6/2023 Yang .................... G06V 20/10
382/103

FOREIGN PATENT DOCUMENTS

| KR | 10-2014-0037753 | 3/2014 |
| KR | 10-2155747 | 9/2020 |
| KR | 102155747 B1 * | 9/2020 |

OTHER PUBLICATIONS

Cuevas, C., Yáñez, E. M., & García, N. (2015). Tool for Semiautomatic Labeling of Moving Objects in Video Sequences: TSLAB. Sensors (Basel, Switzerland), 15(7), 15159-15178. https://doi.org/10.3390/s150715159 (Year: 2015).*

(Continued)

*Primary Examiner* — Utpal D Shah
*Assistant Examiner* — Jack Peter Kraynak
(74) *Attorney, Agent, or Firm* — Youngil Lee

(57) ABSTRACT

The present invention relates to a method, a computing device, and a computer-readable medium for providing guide information on contour information of an object included in an image in crowdsourcing, and more particularly, to a method, a computing device, and a computer-readable medium for providing guide information on contour information of an object included in an image in crowdsourcing, in which guide information for a region set by a worker is generated and displayed on an image when the worker receiving the image corresponding to a work through the crowdsourcing performs labeling of setting the region of the object included in the image, thereby providing a guide on an accurate level required to be set for the region of the object.

6 Claims, 7 Drawing Sheets

(56) References Cited

OTHER PUBLICATIONS

M. Sameki, D. Gurari and M. Betke, "ICORD: Intelligent Collection of Redundant Data—A Dynamic System for Crowdsourcing Cell Segmentations Accurately and Efficiently," 2016 IEEE Conference on Computer Vision and Pattern Recognition Workshops (CVPRW), Las Vegas, NV, USA, 2016, pp. 1380-1389 (Year: 2016).*

Cheplygina, V., Perez-Rovira, A., Kuo, W., Tiddens, H. A. W. M., & de Bruijne, M. (2021). Crowdsourcing airway annotations in chest computed tomography images. PloS one, 16(4), e0249580. https://doi.org/10.1371/journal.pone.0249580 (Year: 2021).*

Office Action for Korea Patent Application No. 10-2021-0072767, dated Aug. 26, 2021.

* cited by examiner

METHOD, COMPUTING DEVICE, AND COMPUTER-READABLE MEDIUM FOR PROVIDING GUIDE INFORMATION ON CONTOUR INFORMATION OF OBJECT INCLUDED IN IMAGE IN CROWDSOURCING

BACKGROUND OF THE INVENTION

1. Field of the Invention

The present invention relates to a method, a computing device, and a computer-readable medium for providing guide information on contour information of an object included in an image in crowdsourcing, and more particularly, to a method, a computing device, and a computer-readable medium for providing guide information on contour information of an object included in an image in crowdsourcing, in which guide information for a region set by a worker is generated and displayed on an image when the worker receiving the image corresponding to a work through the crowdsourcing performs labeling of setting the region of the object included in the image, thereby providing a guide on an accurate level required to be set for the region of the object.

2. Description of the Related Art

Recently, as technology development related to artificial intelligence is actively conducted, the importance of technology that builds data for learning artificial intelligence is also being spotlighted. Since the artificial intelligence, especially deep learning-based artificial intelligence exhibits the better performance when quantity and quality of learning data are excellent, the construction of high-quality learning data is an important factor in the development of artificial intelligence.

Recently, methods for building learning data based on crowdsourcing have been used for constructing the learning data. The crowdsourcing refers to a scheme in which works such as images, videos, audios and texts are provided to an unspecified number of workers, the workers perform tasks such as labeling or the like on the works, task results performed by the workers are provided to a plurality of reviewers and reviewed by the reviewers, and learning data is constructed based on the works having passed the reviews.

According to the conventional technology using crowdsourcing, workers and reviewers are provided with tasks based on a project. A plurality of workers derives task results on a plurality of tasks included in the project, and the reviewers derive review results by reviewing the task results for the project. Finally, when the reviews for all the task results for the project is completed, a correct answer for each task result is outputted (inferred), and a predetermined reward according to the correct answer is provided to the worker and the reviewer.

In addition, representative tasks performed by workers in the crowdsourcing manner include a task of labeling a specific object included in an image by setting a region of the specific object. Specifically, in order to set the region of the specific object included in the image, the worker may mark the region of the specific object in a predetermined shape such as a rectangle (bounding box), or assign 3 or more points along a border of the specific object to connect adjacent points in a straight line, thereby marking the region of the specific object (polygon).

As in the above, in the related art upon the task of setting the region for the specific object on the image, it is difficult for the worker to determine an accurate level of the region of the object is required to be set. For example, when a region of an object is indicated with a bounding box, the worker cannot know an exact allowed distance between the object and the figure set by the worker. When the region of the object is indicated in a polygon manner, the worker cannot know an exact allowed distance between a border of the object and a point to be assigned.

In addition to the failure that the worker cannot be provided with a task guideline due to the above problems, data quality may be deteriorated when the worker inaccurately sets the region of the object, and the labeling working time may become longer though the data quality is improved when the worker precisely sets the region of the object. Accordingly, it causes a fundamental problem in that it is difficult to smoothly acquire labeled learning data to be ultimately implemented through the crowdsourcing.

Accordingly, it is required to develop a method for enabling workers to efficiently mark regions of objects when the workers label the regions of the objects in images.

SUMMARY OF THE INVENTION

The present invention relates to a method, a computing device, and a computer-readable medium for providing guide information on contour information of an object included in an image in crowdsourcing, and more particularly, provides a method, a computing device, and a computer-readable medium for providing guide information on contour information of an object included in an image in crowdsourcing, in which guide information for a region set by a worker is generated and displayed on an image when the worker receiving the image corresponding to a work through the crowdsourcing performs labeling of setting the region of the object included in the image, thereby providing a guide on an accurate level required to be set for the region of the object.

In order to solve the above problem, one embodiment of the present invention provides a method of providing guide information on contour information of an object included in an image provided as a work in crowdsourcing performed on a computing device including at least one processor and at least one memory, and the method includes: an image display step of displaying an image including at least one unit task; a contour information input step of receiving, from a user, contour information in which a contour of the object corresponding to the unit task included in the image is displayed as a closed curve; a guide information generation step of generating guide information corresponding to a shape of the closed curve of the contour information based on a preset guide generation value; and a guide information display step of displaying the guide information inside the contour information inputted for the object.

According to one embodiment of the present invention, in the contour information input step, contour information may be inputted from the user by adjusting a position and a size of a preset figure.

According to one embodiment of the present invention, in the contour information input step, contour information may be inputted by connecting three or more contour points inputted by the user in an inputted sequence.

According to one embodiment of the present invention, in the guide information generation step, guide information having a closed curve identical to the shape of the closed curve displayed as the contour information, and an area value of a closed curve according to the following [Equation 1] may be generated.

Area value of closed curve=Area value of closed curve displayed as contour information*Guide generation value (wherein,0<guide generation value<1) [Equation 1]

According to one embodiment of the present invention, in the guide information display step, the guide information may be displayed inside the closed curve displayed as the contour information, in which the guide information is displayed such that distances between the closed curve displayed as the contour information and the guide information are always the same at any position.

In order to solve the above problem, one embodiment of the present invention provides a computing device including at least one processor and at least one memory and performing a method of providing guide information on contour information of an object included in an image provided as a work in crowdsourcing, and the computing device performs: an image display step of displaying an image including at least one unit task; a contour information input step of receiving, from a user, contour information in which a contour of the object corresponding to the unit task included in the image is displayed as a closed curve; a guide information generation step of generating guide information corresponding to a shape of the closed curve of the contour information based on a preset guide generation value; and a guide information display step of displaying the guide information inside the contour information inputted for the object.

In order to solve the above problem, one embodiment of the present invention provides a computer program stored on a computer-readable medium and including a plurality of instructions executed by at least one processor, and the computer program includes: an image display step of displaying an image including at least one unit task; a contour information input step of receiving, from a user, contour information in which a contour of the object corresponding to the unit task included in the image is displayed as a closed curve; a guide information generation step of generating guide information corresponding to a shape of the closed curve of the contour information based on a preset guide generation value; and a guide information display step of displaying the guide information inside the contour information inputted for the object.

According to one embodiment of the present invention, when contour information on an object included in an image is received from a user (worker), guide information is generated and displayed on the image, so that the user can recognize how precisely the contour information needs to be entered according to the guide information.

According to one embodiment of the present invention, the guide information is displayed inside the contour information inputted on the object, so that the user (worker) can intuitively adjust contour information according to the guide information so that the border of the object is positioned between the contour information inputted by the user and the guide information.

DETAILED DESCRIPTION OF THE INVENTION

Figure 1:
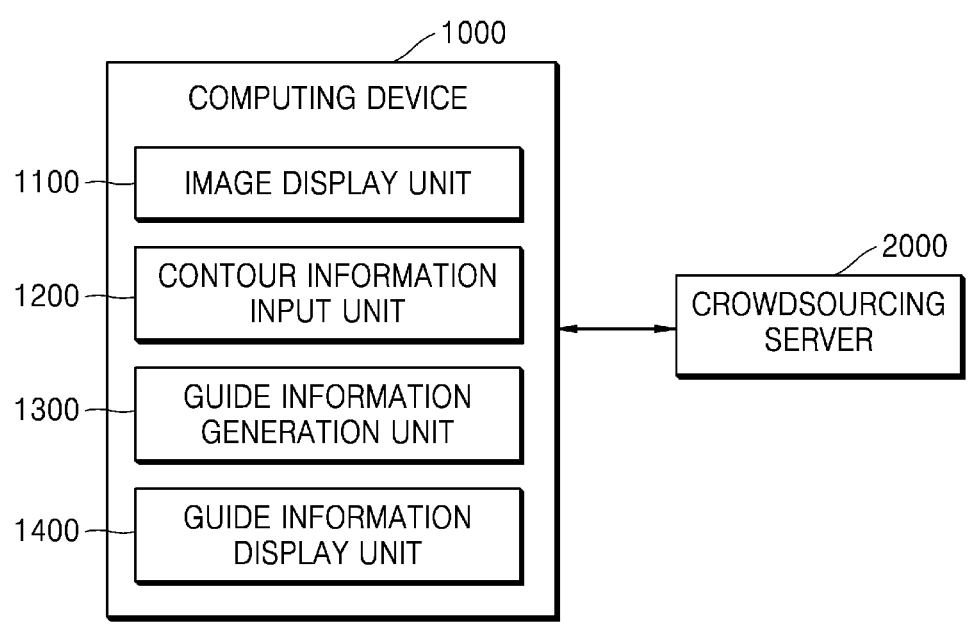
FIG. 1 schematically shows a system including a computing device that performs a method for providing guide information on contour information of an object according to one embodiment of the present invention.

Hereinafter, various embodiments and/or aspects will be described with reference to the drawings. In the following description, numerous specific details are set forth in order to provide a thorough understanding of one or more aspects for the purpose of explanation. However, it will also be appreciated by a person having ordinary skill in the art that such aspect (s) may be carried out without the specific details. The following description and accompanying drawings will be set forth in detail for specific illustrative aspects among one or more aspects. However, the aspects are merely illustrative, some of various ways among principles of the various aspects may be employed, and the descriptions set forth herein are intended to include all the various aspects and equivalents thereof.

In addition, various aspects and features will be presented by a system that may include a plurality of devices, components and/or modules or the like. It will also be understood and appreciated that various systems may include additional devices, components and/or modules or the like, and/or may not include all the devices, components, modules or the like recited with reference to the drawings.

The term "embodiment", "example", "aspect", "exemplification", or the like as used herein may not be construed in that an aspect or design set forth herein is preferable or advantageous than other aspects or designs. The terms 'unit', 'component', 'module', 'system', 'interface' or the like used in the following generally refer to a computer-related entity, and may refer to, for example, hardware, software, or a combination of hardware and software.

In addition, the terms "include" and/or "comprise" specify the presence of the corresponding feature and/or component, but do not preclude the possibility of the presence or addition of one or more other features, components or combinations thereof.

In addition, the terms including an ordinal number such as first and second may be used to describe various components, however, the components are not limited by the terms. The terms are used only for the purpose of distinguishing one component from another component. For example, the first component may be referred to as the second component without departing from the scope of the present invention, and similarly, the second component may also be referred to as the first component. The term "and/or" includes any one of a plurality of related listed items or a combination thereof.

In addition, in embodiments of the present invention, unless defined otherwise, all terms used herein including technical or scientific terms have the same meaning as commonly understood by those having ordinary skill in the art. Terms such as those defined in generally used dictionaries will be interpreted to have the meaning consistent with the meaning in the context of the related art, and will not be interpreted as an ideal or excessively formal meaning unless expressly defined in the embodiment of the present invention.

FIG. 1 schematically shows a system including a computing device that performs a method for providing guide information on contour information of an object according to one embodiment of the present invention.

The system including a computing device 1000 that performs a method for providing guide information on contour information of an object of the present invention includes the computing device 1000 used by a user (worker), and a crowdsourcing server 2000 for communicating with the computing device 1000.

The computing device 1000 including at least one processor and at least one memory includes an image display unit 1100, a contour information input unit 1200, a guide information generation unit 1300 and a guide information display unit 1400 so as to perform the method for providing guide information on contour information of an object of the present invention.

The image display unit 1100 displays an image corresponding to a work which the user needs carry out. The image includes at least one object, and a task performed by the user through the image may include at least one unit task. For example, the image may include a vehicle object and a person object, and the user may use the image to perform a unit task of labeling a vehicle and a unit task of labeling a person.

Preferably, the image display unit 1100 may display a work interface containing an image on which the user needs to work. The work interface may display information on the image and the at least one unit task, and the user may check the information on the unit task and perform the unit task on the work interface. In addition, the unit task may refer to different types of tasks for labeling data in addition to the above-described bounding box and polygon types of tasks.

In addition, the image display unit 1100 may provide a specific image among at least one images stored in the computing device 1000 to the user, or may receive an image allocated to the user from the crowdsourcing server 2000 and provide the image to the user.

The contour information input unit 1200 receives contour information of an object included in the image displayed by the image display unit 1100 from the user. Preferably, the user may input contour information about the object on the image displayed on the work interface, and the contour information inputted by the user may be displayed on the image displayed on the work interface. The contour information is formed in the form of a closed curve, and the user may input the contour information so that the object corresponding to the unit task is included in the closed curve.

When the contour information input unit 1200 receives the contour information by the user, the guide information generation unit 1300 generates guide information corresponding to the contour information. Specifically, the guide information generation unit 1300 may generate guide information that has a shape the same as the closed curve of the contour information, and has the area different from the area inside the closed curve. In addition, the guide information generation unit 1300 may use a preset guide generation value to determine the area inside the closed curve of the guide information to be generated.

According to another embodiment of the present invention, the guide information generation unit 1300 stops generating the guide information while the contour information is being inputted from the contour information input unit 1200, and generates the guide information when the contour information is completely inputted. Accordingly, the user can determine whether the contour information having been inputted by the user is properly inputted according to the guide information.

The guide information display unit 1400 displays the guide information, which is generated by the guide generation unit, on the image in which the contour information inputted by the user is displayed. Specifically, the guide information display unit 1400 displays the generated guide information at a position corresponding to the contour information displayed in the image. More specifically, the guide information display unit 1400 may display the guide information at a position having the same center point as a center point of the closed curve of the contour information displayed on the image.

Preferably, the guide information generation unit 1300 generates the area of the closed curve of the guide information so as to be smaller than the area of the closed curve of the contour information according to the guide generation value, and accordingly, the guide information displayed through the guide information display unit 1400 is positioned inside the closed curve of the contour information.

In addition, the memory included in the computing device 1000 may store information used or generated by the image display unit 1100, the contour information input unit 1200, the guide information generation unit 1300, and the guide information display unit 1400 described above. For example, the memory may store the image provided to the user from the image display unit 1100, the contour information received from the contour information input unit 1200, and the guide information generated from the guide information generation unit 1300.

The crowdsourcing server 2000 performs the method for generating labeled data in a crowdsourced manner by communicating with at least one component including the computing device 1000. Specifically, the crowdsourcing server 2000 may provide the computing device 1000 with an image stored therein or received from an external terminal requesting labeled data, and receive a task result on the image performed by the user from the computing device 1000, thereby deriving labeled data based on the task result.

In addition, in order to derive the labeled data, the crowdsourcing server 2000 may provide a reviewer with the task result and use a review result derived after the reviewer reviews the task result, and the method for deriving labeled data from the task result may correspond to various methods generally used in the crowdsourcing manner.

The computing device 1000 may include a unique application for performing communication with the crowdsourcing server 2000, or may include a web browser for implementing a web page capable of performing communication with the crowdsourcing server 2000. When the user inputs user information such as an ID and password on the unique application or the web page implemented through the web browser, so that the communication between the computing device 1000 and the crowdsourcing server 2000 may be performed.

Figure 2:
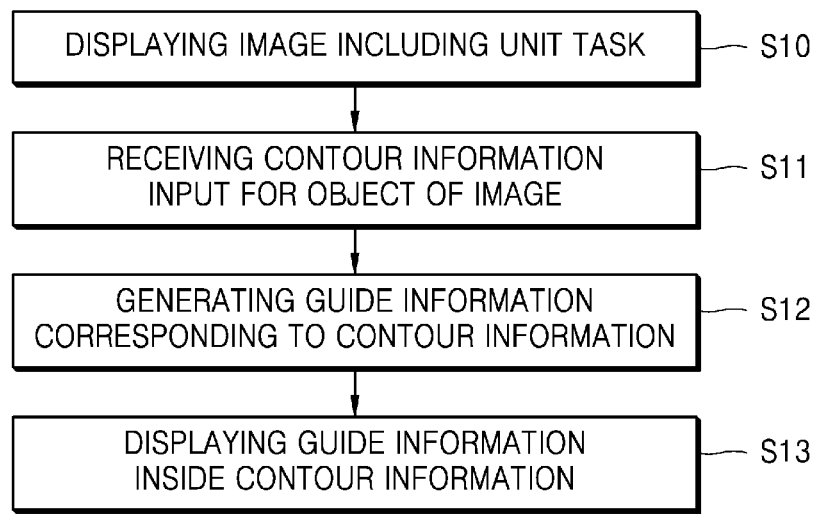
FIG. 2 schematically shows overall steps of a method performed by a computing device to provide guide information on contour information of an object according to one embodiment of the present invention.

FIG. 2 schematically shows overall steps of a method performed by a computing device 1000 to provide guide information on contour information of an object according to one embodiment of the present invention.

As shown in FIG. 2, the method of providing guide information on contour information of an object included in an image provided as a work in crowdsourcing performed on a computing device 1000 including at least one processor and at least one memory may include: an image display step S10 of displaying an image including at least one unit task; a contour information input step S11 of receiving, from a user, contour information in which a contour of the object corresponding to the unit task included in the image is displayed as a closed curve; a guide information generation step S12 of generating guide information corresponding to a shape of the closed curve of the contour information based on a preset guide generation value; and a guide information display step S13 of displaying the guide information inside the contour information inputted for the object.

Specifically, in the image display step S10 performed by the image display unit 1100, an image serving as a work to be provided to the user is displayed on a display of the computing device 1000. More specifically, in the image display step S10, a work interface may be displayed and the image may be displayed on the work interface. In addition, the work interface may display a plurality of display information and a plurality of input elements for performing at least one unit task for the image.

In the contour information input step S11 performed by the contour information input unit 1200, contour information on a specific object included in the image is inputted by the user on the displayed image. Specifically, the specific object may be an object corresponding to the unit task for the image. The contour information indicates a region of the specific object. The user may adjust a border of the specific object into a position and a size of a preset figure to include the specific object in the figure, thereby inputting contour information (bounding box), or the user may sequentially input a plurality of points along the border of the specific object to automatically connect adjacent points with a straight line, thereby inputting contour information having a polygonal shape (polygon). Accordingly, the contour information inputted by the user has a closed curve shape.

In the guide information generation step S12 performed by the guide information generation unit 1300, guide information corresponding to the contour information is generated based on the contour information received in the contour information input step S11. Specifically, the guide information has the same closed curve as the closed curve shape of the above-described contour information, and the area of the closed curve of the guide information has a value less than the area of the closed curve of the above-described contour information. To this end, in the guide information generation step S12, guide information is generated based on the contour information and the preset guide generation value, and a closed curve area value of the guide information may be determined according to the guide generation value.

In the guide information display step S13 performed by the guide information display unit 1400, the guide information generated in the guide information generation step S12 is displayed on the image in which the contour information inputted by the user is displayed. Specifically, in the guide information display step S13, the guide information is overlaid inside the contour information displayed on the image of the work interface.

Since the area of the guide information is smaller than the area of the contour information as described above, the guide information may be positioned inside the contour information. Preferably, in the guide information display step S13, a center point of the closed curve of the guide information may be positioned at the same position as a center point of the closed curve of the contour information, such that a distance between the closed curve of the contour information and the closed curve of the guide information is uniform.

Accordingly, when the user sets the region of the object by inputting the contour information to label the object included in the image, the computing device 1000 generates the guide information corresponding to the contour information and overlays the generated guide information on the image in which the contour information is displayed. Thus, the user may compare the overlaid guide information with the contour information, thereby recognizing whether the object region is correctly set.

Figure 3A:
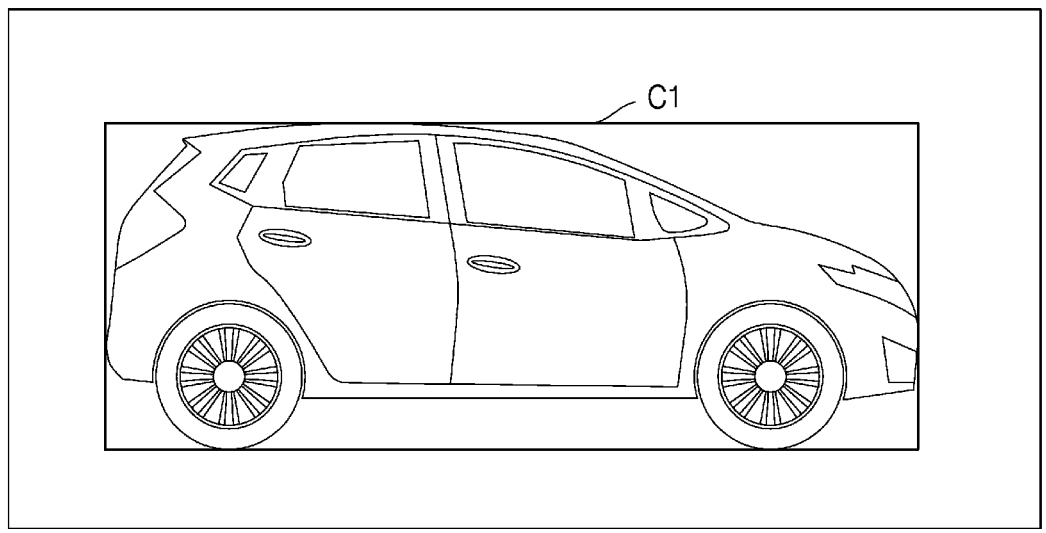
FIGS. 3A and 3B schematically show contour information of an object inputted by a user according to one embodiment of the present invention.
Figure 3B:
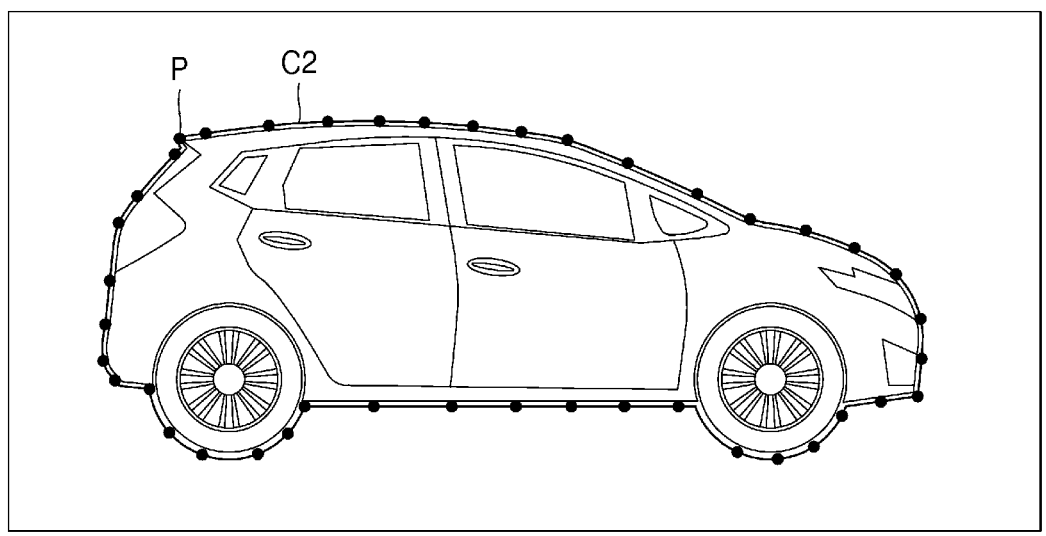

FIGS. 3A and 3B schematically show contour information of an object inputted by a user according to one embodiment of the present invention.

FIG. 3A schematically shows a screen on which the contour information about the region of the object included in the image is displayed in the above-described bounding box manner. FIG. 3B schematically shows a screen on which the contour information about the region of the object included in the image is displayed in the above-described polygon manner.

As shown in FIG. 3A, in the contour information input step S11, contour information C1 may be inputted from the user by adjusting a position and a size of a preset figure.

Specifically, in the contour information input step S11, the user may adjust a position and a size of the figure with respect to an object (vehicle) shown in FIG. 3A to include the object within a predetermined figure (a rectangle in FIG. 3A), so that the contour information C1 may be inputted. For example, the user may input a specific point on the image and perform a drag input to another point to adjust the position and the size of the predetermined figure, so as to input the contour information C1.

In addition, as shown in FIG. 3B, in the contour information input step S11, contour information may be inputted by connecting three or more contour points inputted by the user in an inputted sequence.

Specifically, in the contour information input step S11 with respect to an object (vehicle) shown in FIG. 3B, the user may sequentially input three or more points P along a border of the object to allow the adjacent points P to be automatically connected with a straight line to form a polygonal closed curve, so that contour information C2 may be inputted.

Accordingly, the user may input the contour information in the bounding box or polygon manner for the object of the image. However, since the conventional method for inputting contour information does not provide the user with an accurate standard about the distance between the contour information and the object it is difficult for the user to input the contour information.

In addition, when the user inputs contour information with a considerable distance from the object, the user may quickly perform tasks, but quality of labeled data may be deteriorated. When the user inputs contour information with a very narrow distance from the object, the user may perform high-level tasks that are difficult to quickly carry out and the quality of labeled data may also be improved, but the time for generating the labeled data may be increased.

Thus, according to the present invention, the allowable contour information and the distance from the object are displayed as the guide information, so that the user can conveniently perform tasks, and a balance of relation between an improvement of quality and an increase of generation time with respect to labeled data can be established.

Hereinafter, a process of overlaying guide information on an image overlaid therein with contour information will be described in detail.

Figure 4A:
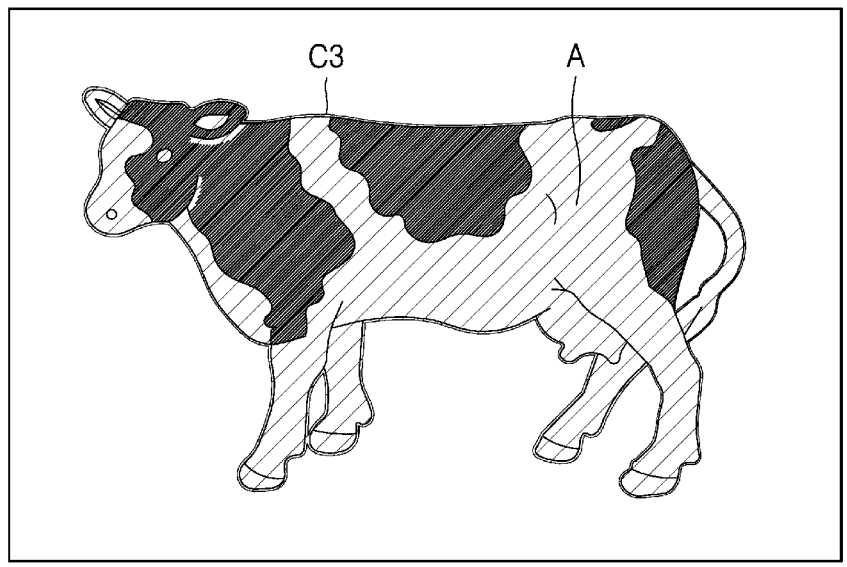
FIGS. 4A and 4B schematically show a screen that displays guide information on an image on which contour information of an object is indicated according to one embodiment of the present invention.
Figure 4B:
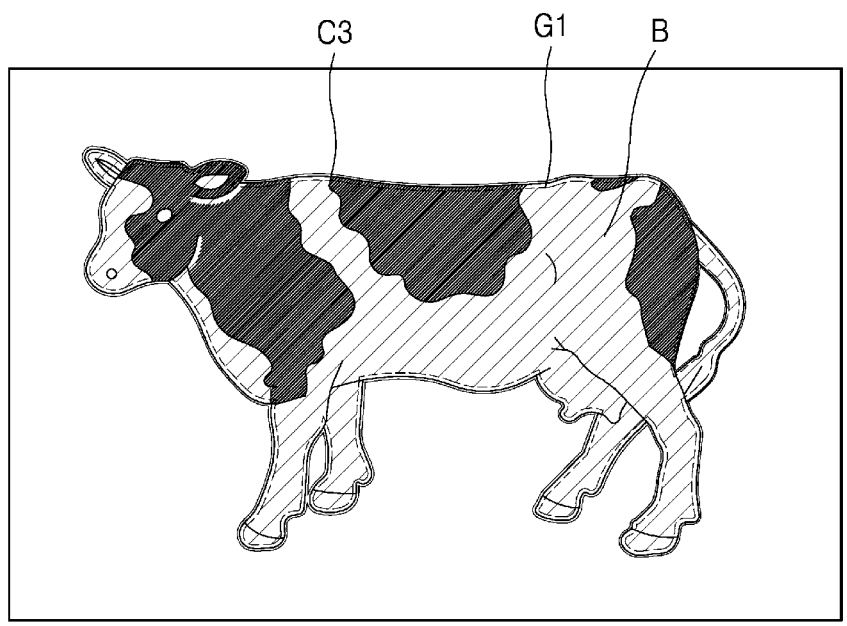

FIGS. 4A and 4B schematically show a screen that displays guide information on an image on which contour information of an object is indicated according to one embodiment of the present invention.

As shown in FIG. 4, in the guide information generation step S12, may generate guide information having a closed curve identical to the shape of the closed curve displayed as the contour information, and an area value of a closed curve according to the following [Equation 1].

Area value of closed curve=area value of closed curve displayed as contour information*guide generation value (wherein,0<guide generation value<1) [Equation 1]

Specifically, FIG. 4A schematically shows a screen in which a polygon type of contour information C3 is overlaid on an object (small) of an image displayed in a work interface. The user may perform a unit task of labeling an object by inputting the contour information C3 for the object of the image, and inputting a category of the contour information C3 for the object on the work interface.

In addition, in the guide information generation step S12, when contour information having a closed curve shape is inputted in the contour information input step S11, the closed curve area A of the contour information is calculated. For the method of calculating the area A inside the closed curve, various generally known methods may be used such as a method of calculating the area by coordinating points defining the closed curve of the contour information.

In the guide information generation step S12, a closed curve shape is provided to have the same as the closed curve shape of the contour information, and guide information G1, which has a calculated closed curve area value A of the contour information, and a closed curve area value B calculated based on the guide generation value, is generated. In addition, as shown in FIG. 4B, in the guide information display step S13, the generated guide information G1 is overlaid on the image.

Specifically, in the guide information generation step S12, as in the above-mentioned [Equation 1], a value obtained by multiplying the calculated area value A of the closed curve of the contour information by the guide generation value is calculated as the area value B of the closed curve of the guide information G1 to be generated. In addition, the guide generation value may have a value greater than 0 and less than 1 so as to generate the guide information G1 having the area value B smaller than the area value A of the contour information.

The guide generation value may be preset to a specific value among values greater than 0 and less than 1. Preferably, the guide generation value may be changed by an administrator of the crowdsourcing server 2000 or a user requesting and ordering labeled data.

The present invention, has described the configuration of generating the guide information by calculating the area value of the guide information compared to the area value of the contour information through the guide generation value. However, another embodiment of the present invention also may, instead of the area value, calculate a length of a specific side of the guide information compared to a length of a specific side such as a horizontal length of the contour information, and reduce the remaining sides in the same way according to the corresponding ratio, thereby generating the guide information.

In addition, according to another embodiment of the present invention, the guide generation value may be a value corresponding to the distance between the contour information and the generated guide information. Accordingly, in the guide information generation step S12, the area of the closed curve spaced apart from the closed curve of the contour information by the distance corresponding to the guide generation value may be calculated, thereby generating the guide information.

As in the above, the guide generation value may refer to a specific point in the relationship between quality of the labeled data and time of generating the labeled data as described above, or may refer to a work difficulty of a user (worker) inputting the contour information.

The user inputting the contour information may place the border of the object to be labeled in a space between the contour information and the guide information, thereby performing the task according to the guide. Accordingly, because a difference between the area value A of the contour information and the area value B of the guide information is greater when the guide generation value is closer to 0, the distance between contour information and the guide information is widened, thereby lowering the work difficulty of the user. Because the difference between the area value A of the contour information and the area value B of the guide information is smaller when the guide generation value is closer to 1, the distance between contour information and the guide information is narrowed, thereby increasing the work difficulty of the user.

According to another embodiment of the present invention, the guide information overlaid on the image through the guide information display step S13 may have a form different from the contour information so as to be easily distinguished from the overlaid contour information, for example, with a color different from the contour information, with being displayed as a dotted line, or with being displayed transparently.

Figure 5:
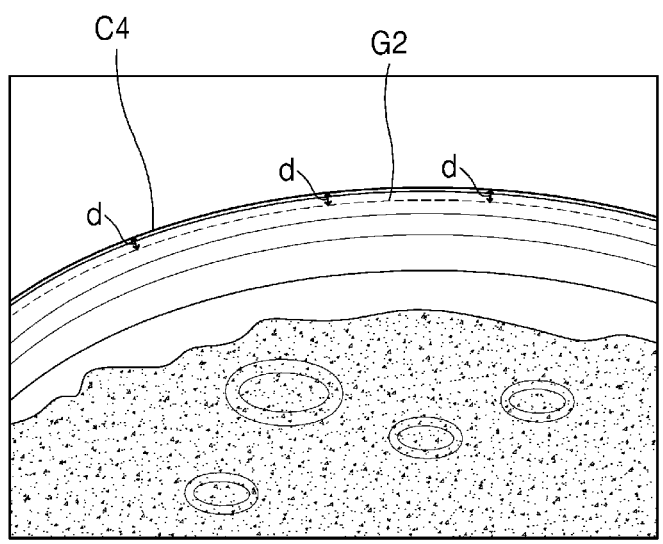
FIG. 5 schematically shows an image in which contour information and guide information on an object according to one embodiment of the present invention.

FIG. 5 schematically shows an image in which contour information and guide information on an object according to one embodiment of the present invention.

As shown in FIG. 5, in the guide information display step S13, the guide information is displayed inside the closed curve displayed as the contour information, in which the guide information may be displayed such that distances between the closed curve displayed as the contour information and the guide information are always the same at any position.

Specifically, as shown in FIG. 5, in the contour information input step S11, the contour information C4 inputted by the user is displayed on the image, and in the guide information display step S13, the generated guide information G2 is displayed on the image in which the contour information C4 is displayed.

More specifically, in the guide information display step S13, the guide information G2 is displayed at a position on the image such that gaps d between the contour information C4 and the guide information G2 are the same at any position. Preferably, the guide information G2 has the same shape as a shape of the closed curve of the contour information C4, and has the area of the closed curve smaller than the area of the closed curve of the contour information C4. Accordingly, in the guide information display step S13, the guide information G2 is displayed on the image to have the same center point as a center point of the closed curve of the contour information C4 on the image, so that the guide information G2 is positioned inside the contour information C4, and the distances d between the contour information C4 and the guide information G2 are the same at any position.

Accordingly, as shown in FIG. 5, when the user inputs the contour information C4 so that the border of the object to be labeled is positioned in the distance d between the contour information C4 and the guide information G2, the user can recognize that the region of the object is normally set according to the guide.

In another embodiment of the present invention, the work interface may display guide information, which informs that the border of the object is required to be positioned between the contour information and the guide information.

Figure 6A:
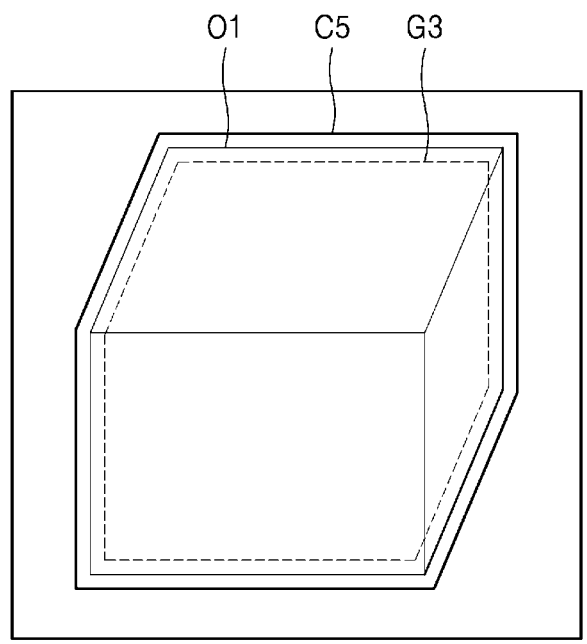
FIGS. 6A and 6B schematically show a configuration in which guide information is displayed according to a distance between an object and contour information according to one embodiment of the present invention.
Figure 6B:
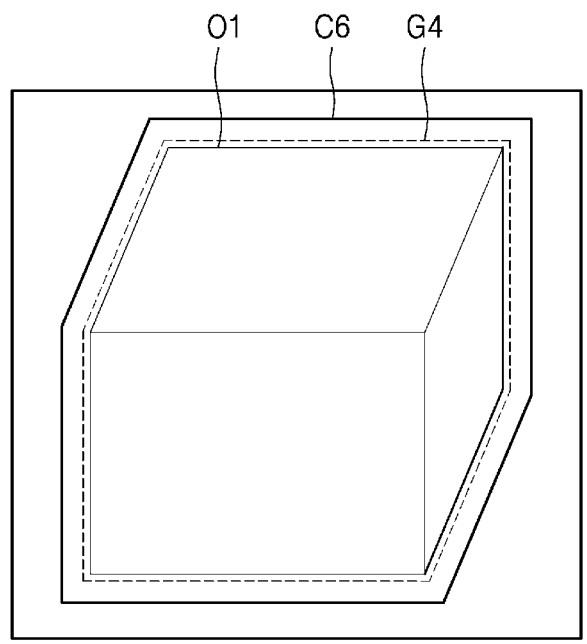

FIGS. 6A and 6B schematically show a configuration in which guide information is displayed according to a distance between an object and contour information according to one embodiment of the present invention.

The drawing shown in FIG. 6A is the case in which the contour information is correctly inputted according to the guide information displayed on the image. When the user inputs contour information C5 for an object O1, contour information C5 is displayed on the image. Thereafter, guide information G3 is displayed on the image on which the contour information C5 is displayed.

As shown in FIG. 6A, when a distance between a closed curve of the contour information C5 inputted by the user for the region of the object O1 and a border of the object O1 is smaller than a distance between the closed curve of the contour information C5 and a closed curve of the guide information G3 determined according to the preset guide generation value, the border of the object O1 is positioned between the contour information C5 and the guide information G3.

Accordingly, when the border of the object O1 is positioned between the contour information C5 and the guide information G3, the user may recognize that the contour information C5 inputted by the user is normally set according to the guide. In addition, the user may set (name) a category for the object to which the contour information C5 is inputted, so as to derive the task result for the unit task of setting the region of the object and inputting what the object is.

On the contrary, the drawing shown in FIG. 6B is a case in which the contour information is inputted inconsistent with the guide information displayed on the image. Likewise, when the user inputs contour information C6 for the object O1, contour information C6 is displayed on the image. Thereafter, guide information G4 is displayed on the image on which the contour information C6 is displayed.

As shown in FIG. 6B, when a distance between a closed curve of the contour information C6 inputted by the user for the region of the object O1 and the border of the object O1 is greater than a distance between the closed curve of the contour information C6 and a closed curve of the guide information G4 determined according to the preset guide generation value, the border of the object O1 is positioned inside the guide information G4.

Accordingly, when the border of the object O1 is not positioned between the contour information C6 and the guide information G4, the user may recognize that the contour information C6 inputted by the user is set inconsistent with the guide, and may re-input the contour information for the corresponding object O1 through the work interface. At this point, separate guide information may be generated and displayed on the image according to the contour information re-inputted by the user.

In one embodiment of the present invention, the user's inputting the contour information itself to position the border of the object between the contour information and the guide information does not signify that the task result for the unit task performed by the user has been passed.

For example, when the user performs the unit task of inputting contour information for a specific object and inputting a category of the object to complete the task result, and even when the contour information is inputted correctly according to the guide information, it is required to review whether the object is a corresponding object required for the unit task, and whether the object matches the category inputted by the user. The task result performed by the user may be considered to be passed only when the review on the task result has been passed.

Figure 7:
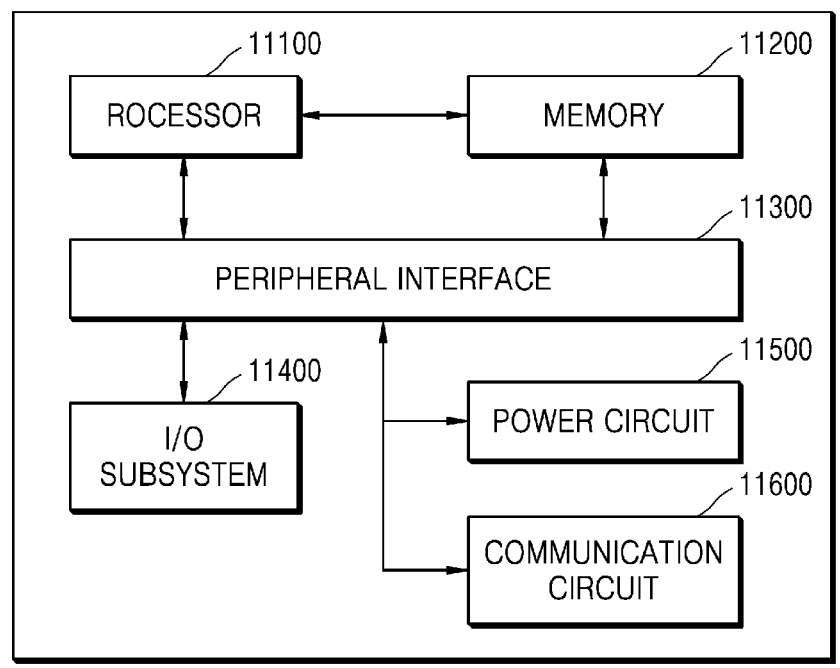
FIG. 7 schematically shows internal components of the computing device according to one embodiment of the present invention.

FIG. 7 schematically shows internal components of the computing device according to one embodiment of the present invention.

The computing device 1000 shown in the above-described FIG. 1 may include components of the computing device 11000 shown in FIG. 7.

As shown in FIG. 7, the computing device 11000 may at least include at least one processor 11100, a memory 11200, a peripheral device interface 11300, an input/output subsystem (I/O subsystem) 11400, a power circuit 11500, and a communication circuit 11600. The computing device 11000 may correspond to the computing device 1000 shown in FIG. 1.

The memory 11200 may include, for example, a high-speed random access memory, a magnetic disk, an SRAM, a DRAM, a ROM, a flash memory, or a non-volatile memory. The memory 11200 may include a software module, an instruction set, or other various data necessary for the operation of the computing device 11000.

The access to the memory 11200 from other components of the processor 11100 or the peripheral interface 11300, may be controlled by the processor 11100.

The peripheral interface 11300 may combine an input and/or output peripheral device of the computing device 11000 to the processor 11100 and the memory 11200. The processor 11100 may execute the software module or the instruction set stored in memory 11200, thereby performing various functions for the computing device 11000 and processing data.

The input/output subsystem may combine various input/output peripheral devices to the peripheral interface 11300. For example, the input/output subsystem may include a controller for combining the peripheral device such as monitor, keyboard, mouse, printer, or a touch screen or sensor, if needed, to the peripheral interface 11300. According to another aspect, the input/output peripheral devices may be combined to the peripheral interface 11300 without passing through the I/O subsystem.

The power circuit 11500 may provide power to all or a portion of the components of the terminal. For example, the power circuit 11500 may include a power failure detection circuit, a power converter or inverter, a power status indicator, a power failure detection circuit, a power converter or inverter, a power status indicator, or any other components for generating, managing, and distributing the power.

The communication circuit 11600 may use at least one external port, thereby enabling communication with other computing devices.

Alternatively, as described above, if necessary, the communication circuit 11600 may transmit and receive an RF signal, also known as an electromagnetic signal, including RF circuitry, thereby enabling communication with other computing devices.

The above embodiment of FIG. 10 is merely an example of the computing device 11000, and the computing device 11000 may have a configuration or arrangement in which some components shown in FIG. 10 are omitted, additional components not shown in FIG. 10 are further provided, or at least two components are combined. For example, a computing device for a communication terminal in a mobile environment may further include a touch screen, a sensor or the like in addition to the components shown in FIG. 10, and the communication circuit 11600 may include a circuit for RF communication of various communication schemes (such as WiFi, 3G, LTE, Bluetooth, NFC, and Zigbee). The components that may be included in the computing device 11000 may be implemented by hardware, software, or a combination of both hardware and software which include at least one integrated circuit specialized in a signal processing or an application.

The methods according to the embodiments of the present invention may be implemented in the form of program instructions to be executed through various computing devices, thereby being recorded in a computer-readable medium. In particular, a program according to an embodiment of the present invention may be configured as a PC-based program or an application dedicated to a mobile terminal. The application to which the present invention is applied may be installed in the computing device 11000 through a file provided by a file distribution system. For example, a file distribution system may include a file transmission unit (not shown) that transmits the file according to the request of the computing device 11000.

The above-mentioned device may be implemented by hardware components, software components, and/or a combination of hardware components and software components. For example, the devices and components described in the embodiments may be implemented by using at least one general purpose computer or special purpose computer, such as a processor, a controller, an arithmetic logic unit (ALU), a digital signal processor, a microcomputer, a field programmable gate array (FPGA), a programmable logic unit (PLU), a microprocessor, or any other device capable of executing and responding to instructions. The processing device may execute an operating system (OS) and at least one software application executed on the operating system. In addition, the processing device may access, store, manipulate, process, and create data in response to the execution of the software. For the further understanding, some cases may have described that one processing device is used, however, it is well known by those skilled in the art that the processing device may include a plurality of processing elements and/or a plurality of types of processing elements. For example, the processing device may include a plurality of processors or one processor and one controller. In addition, other processing configurations, such as a parallel processor, are also possible.

The software may include a computer program, a code, and an instruction, or a combination of at least one thereof, and may configure the processing device to operate as desired, or may instruct the processing device independently or collectively. In order to be interpreted by the processor or to provide instructions or data to the processor, the software and/or data may be permanently or temporarily embodied in any type of machine, component, physical device, virtual equipment, computer storage medium or device, or in a signal wave to be transmitted. The software may be distributed over computing devices connected to networks, so as to be stored or executed in a distributed manner. The software and data may be stored in at least one computer-readable recording medium.

The method according to the embodiment may be implemented in the form of program instructions to be executed through various computing mechanisms, thereby being recorded in a computer-readable medium. The computer-readable medium may include program instructions, data files, data structures, and the like, independently or in combination thereof. The program instructions recorded on the medium may be specially designed and configured for the embodiment, or may be known to those skilled in the art of computer software so as to be used. An example of the computer-readable medium includes a magnetic medium such as a hard disk, a floppy disk and a magnetic tape, an optical medium such as a CD-ROM and a DVD, a magneto-optical medium such as a floptical disk, and a hardware device specially configured to store and execute a program instruction such as ROM, RAM, and flash memory. An example of the program instruction includes a high-level language code to be executed by a computer using an interpreter or the like as well as a machine code generated by a compiler. The above hardware device may be configured to operate as at least one software module to perform the operations of the embodiments, and vice versa.

According to one embodiment of the present invention, when contour information on an object included in an image is received from a user (worker), guide information is generated and displayed on the image, so that the user can recognize how precisely the contour information needs to be entered according to the guide information.

According to one embodiment of the present invention, the guide information is displayed inside the contour information inputted on the object, so that the user (worker) can intuitively adjust contour information according to the guide information so that the border of the object is positioned between the contour information inputted by the user and the guide information.

Although the above embodiments have been described with reference to the limited embodiments and drawings, however, it will be understood by those skilled in the art that various changes and modifications may be made from the above-mentioned description. For example, even though the described descriptions may be performed in an order different from the described manner, and/or the described components such as system, structure, device, and circuit may be coupled or combined in a form different from the described manner, or replaced or substituted by other components or equivalents, appropriate results may be achieved.

Therefore, other implementations, other embodiments, and equivalents to the claims are also within the scope of the following claims.

What is claimed is:

1. A method of providing guide information on contour information of an object included in an image provided as a work in crowdsourcing performed on a computing device including at least one processor and at least one memory, the method comprising:
   an image display step of displaying an image including at least one unit task;
   a contour information input step of receiving, from a user, contour information of the object corresponding to the unit task included in the image, wherein the contour information received by the user is displayed as a closed curve;

a guide information generation step of generating guide information corresponding to a shape of the closed curve of the contour information based on a preset guide generation value; and a guide information display step of displaying the guide information inside the contour information inputted for the object, wherein the guide information generation step includes generating guide information having a closed curve identical to the shape of the closed curve displayed as the contour information, and an area value of a closed curve according to the following [Equation 1]:

Area value of closed curve=area value of closed curve displayed as the contour information*guide generation value (wherein, 0<guide generation value<1). [Equation 1]

2. The method of claim 1, wherein the contour information input step includes receiving the contour information from the user by adjusting a position and a size of a preset figure.

3. The method of claim 1, wherein the contour information input step includes receiving the contour information by connecting three or more contour points inputted by the user in an inputted sequence.

4. The method of claim 1, wherein the guide information display step includes displaying the guide information inside the closed curve displayed as the contour information, in which the guide information is displayed such that distances between the closed curve displayed as the contour information and the guide information are always the same at any position.

5. A computing device including at least one processor and at least one memory and performing a method of providing guide information on contour information of an object included in an image provided as a work in crowdsourcing, the computing device performs:

an image display step of displaying an image including at least one unit task;

a contour information input step of receiving, from a user, contour information of the object corresponding to the unit task included in the image, wherein the contour information received by the user is displayed as a closed curve;

a guide information generation step of generating guide information corresponding to a shape of the closed curve of the contour information based on a preset guide generation value; and a guide information display step of displaying the guide information inside the contour information inputted for the object, wherein the guide information generation step includes generating guide information having a closed curve identical to the shape of the closed curve displayed as the contour information, and an area value of a closed curve according to the following [Equation 1]:

Area value of closed curve=area value of closed curve displayed as the contour information*guide generation value (wherein, 0<guide generation value<1). [Equation 1]

6. A non-transitory computer-readable medium storing a plurality of instructions that, when executed by at least one processor, cause the at least one processor to perform operations, wherein the operations comprise:

an image display step of displaying an image including at least one unit task;

a contour information input step of receiving, from a user, contour information of the object corresponding to the unit task included in the image, wherein the contour information received by the user is displayed as a closed curve;

a guide information generation step of generating guide information corresponding to a shape of the closed curve of the contour information based on a preset guide generation value; and a guide information display step of displaying the guide information inside the contour information inputted for the object, wherein the guide information generation step includes generating guide information having a closed curve identical to the shape of the closed curve displayed as the contour information, and an area value of a closed curve according to the following [Equation 1]:

Area value of closed curve=area value of closed curve displayed as the contour information*guide generation value (wherein, 0<guide generation value<1). [Equation 1]

* * * * *